US008851551B1

(12) United States Patent
Kaufman et al.

(10) Patent No.: US 8,851,551 B1
(45) Date of Patent: Oct. 7, 2014

(54) VEHICLE FLOOR COVER RETENTION SYSTEM AND DEVICE (71) Applicant: MacNeil IP LLC, Bolingbrook, IL (US)

(72) Inventors: Judd C. Kaufman, Clarendon Hills, IL (US); David S. Iverson, Chicago, IL (US); Frederick W. Masanek, Jr., Barrington, IL (US); Ryan Granger, Homer Glen, IL (US); Allan R. Thom, Clarendon Hills, IL (US)

(73) Assignee: MacNeil IP LLC, Bolingbrook, IL (US)

( * ) Notice: Subject to any disclaimer, the term of this patent is extended or adjusted under 35 U.S.C. 154(b) by 0 days.

(21) Appl. No.: 13/915,791

(22) Filed: Jun. 12, 2013

(51) Int. Cl.
*B60N 3/04* (2006.01)
*F16B 19/00* (2006.01)

(52) U.S. Cl.
CPC ............... *B60N 3/046* (2013.01); *F16B 19/00* (2013.01)
USPC .................. 296/97.23; 16/4; 24/297; 24/458; 24/581.11

(58) Field of Classification Search
CPC .......... B60N 3/04; B60N 3/044; B60N 3/048; B60N 3/046
USPC ........ 296/97.23; 24/297, 458, 581.11; 16/4, 8
See application file for complete search history.

(56) References Cited

U.S. PATENT DOCUMENTS

| 707,054 | A | 8/1902 | Dowse |
| 1,647,781 | A | 11/1927 | Carr |
| 1,732,203 | A | 10/1929 | Kimbell |
| 1,896,873 | A | 2/1933 | Upham |
| 2,015,049 | A | 9/1935 | Carr |
| 2,042,866 | A | 6/1936 | Simons |
| 2,129,825 | A | 9/1938 | Dews |
| 2,131,347 | A | 9/1938 | Fenton |
| 2,212,361 | A | 8/1940 | Arthur |
| 2,242,352 | A | 5/1941 | Fenton |

(Continued)

FOREIGN PATENT DOCUMENTS

| CA | 2420510 | * | 2/2003 |
| DE | 364426 A | | 11/1922 |

(Continued)

OTHER PUBLICATIONS

European Patent Office, Extended European Search Report issued on Jun. 6, 2014 on European Patent Application No. 14162357.9.

(Continued)

*Primary Examiner* — Dennis H Pedder
(74) *Attorney, Agent, or Firm* — Perkins IP Law Group LLC; Jefferson Perkins (57) ABSTRACT Closed sockets are formed in the lower surface of a vehicle floor cover, such as a mat or tray. Each socket is adapted to receive a vehicle floor cover retention device which stands up from the floor of the vehicle foot well in which the floor cover is being installed. The sidewall of the body of each device acts as a physical stop to the sidewall of a respective socket, preventing or mitigating movement of the floor cover within the foot well. The top surface of the device may have a first fastener which is adapted to engage a second fastener on the ceiling of the socket. The device may be an adapter which is fastened to preexisting OEM mat retention structure. Embodiments of the adapter include one assembled from two pieces around an OEM retention post with an enlarged head.

15 Claims, 11 Drawing Sheets

(56) References Cited

U.S. PATENT DOCUMENTS

| | | |
|---|---|---|
| 2,256,850 A | 9/1941 | Purinton |
| 2,385,774 A | 10/1945 | Clarke |
| 2,519,316 A | 8/1950 | Jones |
| 2,668,340 A | 2/1954 | Jones |
| 2,683,908 A | 7/1954 | Carpinella |
| 2,724,162 A | 11/1955 | Fenton |
| 2,724,884 A | 11/1955 | Jones |
| 2,745,160 A | 5/1956 | Jones |
| 2,771,653 A | 11/1956 | Carpinella |
| 2,799,910 A | 7/1957 | Weber |
| 2,941,270 A | 6/1960 | Long |
| 3,010,169 A | 11/1961 | Carpinella |
| 3,031,730 A | 5/1962 | Morin |
| 3,091,795 A | 6/1963 | Budwig |
| 3,135,820 A | 6/1964 | Hallett, Jr. et al. |
| 3,613,181 A | 10/1971 | Taylor |
| 3,851,357 A | 12/1974 | Ribich et al. |
| 3,895,797 A | 7/1975 | Moore |
| 3,914,144 A | 10/1975 | Ribich et al. |
| 3,916,703 A | 11/1975 | Ribich et al. |
| 4,017,945 A | 4/1977 | Stanik et al. |
| 4,212,051 A | 7/1980 | Kulik |
| 4,392,279 A | 7/1983 | Schwager |
| 4,403,895 A | 9/1983 | Caldwell et al. |
| 4,406,033 A | 9/1983 | Chisholm et al. |
| 4,430,777 A | 2/1984 | Takeda |
| 4,531,733 A | 7/1985 | Hall |
| 4,561,146 A | 12/1985 | Schaty |
| 4,562,624 A | 1/1986 | Kanzaka |
| 4,751,764 A | 6/1988 | Reuben |
| 4,829,627 A * | 5/1989 | Altus et al. ............ 16/4 |
| 4,833,760 A | 5/1989 | Sundstrom |
| 4,860,402 A | 8/1989 | Dichtel |
| 4,878,792 A | 11/1989 | Frano |
| 4,883,331 A | 11/1989 | Mengel |
| 4,901,961 A | 2/1990 | Gish |
| 4,921,742 A | 5/1990 | Altus |
| 4,981,405 A | 1/1991 | Kato |
| 4,998,319 A | 3/1991 | Ford |
| 5,003,664 A | 4/1991 | Wong |
| 5,011,356 A | 4/1991 | Fernandez |
| 5,014,390 A | 5/1991 | De Gastines |
| 5,048,160 A | 9/1991 | Goodrich et al. |
| 5,058,245 A | 10/1991 | Saito |
| 5,134,757 A | 8/1992 | Johnson |
| 5,170,985 A | 12/1992 | Killworth et al. |
| 5,195,857 A | 3/1993 | Hiramoto |
| 5,282,616 A | 2/1994 | Stacavich-Notaro |
| 5,335,893 A | 8/1994 | Opp |
| 5,362,187 A | 11/1994 | Scalise |
| 5,364,150 A | 11/1994 | Cochran et al. |
| 5,384,939 A | 1/1995 | Weber |
| 5,390,397 A | 2/1995 | Kremer et al. |
| 5,511,283 A | 4/1996 | Hirose |
| 5,511,919 A | 4/1996 | Scalise |
| 5,537,793 A | 7/1996 | Murasaki |
| 5,566,430 A | 10/1996 | Cheng |
| 5,636,408 A | 6/1997 | Dichtel |
| 5,647,107 A | 7/1997 | Brewster |
| D390,099 S | 2/1998 | Bailey et al. |
| D392,877 S | 3/1998 | Eguchi |
| D396,406 S | 7/1998 | Eguchi |
| D396,440 S | 7/1998 | Reilly |
| 5,775,859 A | 7/1998 | Anscher |
| 5,897,278 A | 4/1999 | Frattarola |
| 6,099,015 A | 8/2000 | Marcy |
| 6,233,782 B1 | 5/2001 | Regele et al. |
| 6,345,946 B1 | 2/2002 | Mainini et al. |
| 6,357,090 B1 | 3/2002 | Murai |
| 6,381,806 B1 | 5/2002 | Stanesic et al. |
| 6,497,003 B2 | 12/2002 | Calabrese |
| 6,568,893 B2 | 5/2003 | LeVey et al. |
| 6,595,155 B1 | 7/2003 | Akers |
| 6,612,795 B2 | 9/2003 | Kirchen |
| 6,735,819 B2 | 5/2004 | Iverson et al. |
| 6,757,945 B2 | 7/2004 | Shibuya et al. |
| 7,131,806 B2 | 11/2006 | Hansen |
| 7,546,661 B2 | 6/2009 | Connor, Jr. |
| 7,945,992 B2 | 5/2011 | Parisi et al. |
| 8,122,567 B2 | 2/2012 | Connor, Jr. |
| 8,122,574 B2 | 2/2012 | Dammermann |
| D679,169 S | 4/2013 | Else |
| D679,170 S | 4/2013 | Else |
| 8,720,842 B2 | 5/2014 | Huang et al. |
| 8,757,698 B1 * | 6/2014 | Rowland ............ 296/97.23 |
| 2007/0011844 A1 | 1/2007 | Aoki et al. |
| 2009/0235485 A1 | 9/2009 | Connor, Jr. |
| 2009/0269546 A9 | 10/2009 | Alford |
| 2010/0122429 A1 | 5/2010 | Gonzalez et al. |
| 2011/0094071 A1 | 4/2011 | Veldhoen |
| 2013/0152347 A1 | 6/2013 | Hasegawa |
| 2013/0287996 A1 | 10/2013 | Masanek, Jr. et al. |

FOREIGN PATENT DOCUMENTS

| | | |
|---|---|---|
| DE | 1952826 U | 1/1967 |
| DE | 3142761 A1 | 9/1982 |
| DE | 8320276.5 U1 | 12/1983 |
| DE | 3238121 A1 | 4/1984 |
| DE | 3240270 A1 | 5/1984 |
| DE | 3427641 A1 | 1/1986 |
| DE | 3632618 A1 | 4/1988 |
| DE | 8911331 U1 | 12/1989 |
| DE | 8717754.4 U1 | 2/1990 |
| DE | 9115861.3 U1 | 4/1992 |
| DE | 9300657.8 U1 | 4/1993 |
| DE | 4204410 A1 | 8/1993 |
| DE | 4218213 C1 | 10/1994 |
| DE | 19805949 A1 | 8/1999 |
| DE | 19845663 A1 | 4/2000 |
| DE | 20001405 U1 | 5/2000 |
| DE | 10059322 A1 | 7/2001 |
| DE | 19617408 C2 | 2/2003 |
| DE | 102006053623 A1 | 5/2008 |
| DE | 19655255 B4 | 4/2013 |
| EP | 0058252 A1 | 8/1982 |
| EP | 0211966 A1 | 3/1987 |
| EP | 0561055 A2 | 9/1993 |
| EP | 1232070 B1 | 1/2005 |
| EP | 1980444 A2 | 10/2008 |
| FR | 34722 A | 9/1929 |
| FR | 1405310 A | 7/1965 |
| FR | 1493333 A | 8/1967 |
| FR | 92613 A | 12/1968 |
| FR | 2198717 A1 | 4/1974 |
| GB | 542153 A | 12/1941 |
| GB | 936095 A | 9/1963 |
| GB | 1073408 A | 6/1967 |
| GB | 1236407 A | 6/1971 |
| GB | 2087229 A | 5/1982 |
| JP | 6388178 U | 6/1988 |
| JP | 1317838 A | 12/1989 |
| JP | H2-77312 U | 6/1990 |
| JP | 733737 U | 6/1995 |
| JP | 2000095010 A | 4/2000 |
| WO | 9116218 A1 | 10/1991 |
| WO | 0055007 A1 | 9/2000 |
| WO | 0136227 A2 | 5/2001 |
| WO | 2012039058 A1 | 3/2012 |

OTHER PUBLICATIONS

European Patent Office, Extended European Search Report issued on Jun. 16, 2014 on European Patent Application No. 14162359.5.

USPTO/ISA, International Search Report and Written Opinion of the International Searching Authority, issued on Oct. 10, 2013 on Application No. PCT/US2013/038361.

* cited by examiner

VEHICLE FLOOR COVER RETENTION SYSTEM AND DEVICE

BACKGROUND OF THE INVENTION

In most conventional vehicles, such as cars, trucks and SUV's, the foot wells for the occupants are carpeted. Vehicle floor covers, including floor mats and trays, have been provided to protect the foot wells of these vehicles. However, vehicle drivers and passengers tend to move their feet around, which can bunch up or cause folding of a mat, or possibly shift the position of the mat or tray, causing the gas, brake or clutch pedals, or other vehicle controls or features, to be occluded. Vehicle floor trays, which are fit to the three dimensional walls of the foot well, are sturdier and less prone to deformation and shifting, yet still require placement and securing aids.

To aid in the placement and stability of floor covers and ultimately provide a more solid feel to the occupant's feet, vehicle manufacturers (commonly called original equipment manufacturers or OEMs) now usually place retention posts or other devices or structure in the vehicle foot wells. Often the floor mats or trays are designed to have respective apertures sized to accept the retention posts through them. However, retention post placement varies from manufacturer to manufacturer and may even vary from model to model. If the retention post placement is repositioned even a slight amount, the holes in the mats and trays will need to be likewise repositioned, requiring redesign of the mats and trays. In addition OEM mat retention systems vary widely; some use upstanding posts, others use hooks, still others use preformed holes or cavities in the foot well floor to which other fasteners are affixed. Some OEM retention devices terminate in a knob which is twisted to lock the mat or tray in place. The variance in OEM mat retention systems makes the provision of aftermarket floor mats and trays for these models more costly and less universal. Further, intentionally providing a hole through a vehicle floor cover necessarily reduces its ability to protect the carpeting underneath from debris and fluids.

Most OEM floor mat retention devices require a modicum of mental and physical effort on the part of the end user to effectively fasten the mat to the floor and, without the exercise of this level of care and effort, may not be adequately engaged. Thus a need exists for a vehicle retention post attachment device that can be used to secure a vehicle floor mat or tray without the need for an aperture in the mat or tray, and which relies on a more universal, passive and error-free means to prevent the lateral shifting of a floor mat or tray in a vehicle foot well.

SUMMARY OF THE INVENTION

In one aspect of the invention, a vehicle floor cover retention system is provided in which a vehicle floor cover, such as a mat or tray, has one or more sockets formed in its lower surface. The system further includes, for each socket, a retention device which stands up from the vehicle foot well floor. The socket has a sidewall of a predetermined depth that extends from the general lower surface of the floor cover to a closed ceiling. A socket depth is preselected to be more than or equal to a height of a sidewall of the retention device. The sidewall of the retention device is high enough that it acts as a physical stop to the sidewall of the socket, thereby preventing or mitigating lateral movement of the floor cover inside the vehicle foot well. The body of the retention device can be circularly cylindrical, or have a sidewall that is slightly inversely frustoconical (with a top being slightly larger than a bottom). The socket can likewise be substantially circularly cylindrical, but may have a draft for reasons of manufacturability. The retention device further includes a connector of one of many different kinds. Many of the retention devices are in the nature of adapters and fasten in various ways to the OEM retention devices in the foot well. But at least one embodiment of the invention's retention device is not an adapter but fastens directly into the carpet backing. A top surface of the retention device of the invention can have a fastener, such as hook and loop material, a magnet, or a physical snap, which fastens to a corresponding fastener disposed on the ceiling of the socket which receives the retention device.

A principal advantage of the retention system of the invention is its relatively passive nature. The end user does not have to forcibly push or snap a device on a mating piece, nor does he or she have to rotate a part to attach the mat or tray. Once an adapter has been installed on the OEM retention structure, one time, the tray can be placed on or lifted off of the adapters with a simple motion. The adapters thus locate the mat or tray and retain it.

According to another aspect of the invention, there is provided a multiple-piece retention device or adapter which is removably installed by a consumer onto an original equipment manufacturer (OEM) vehicle foot well retention post which extends upwardly from a floor of the vehicle foot well. The OEM retention post has a shaft portion of one diameter and a head portion of a second, larger diameter. A cavity, disposed inside a body of the adapter, is dimensioned to receive the head of the OEM retention post. An engagement ridge, axially spaced from an upper surface of the body, extends inwardly from a general inner surface of the cavity and forms a passageway dimensioned to receive the shaft of the OEM retention post. The body may be divided into two or more pieces where each of the pieces includes a portion of the engagement ridge and where the pieces are capable of being securely attached to one another. A first fastener is disposed on the upper surface of the body, which is fastenable to a second fastener disposed on a lower surface of the mat or tray being retained.

The present invention provides an advantage over making a hole in the vehicle floor cover sized to receive a vehicle retention post. When the head of the retention post is large, in the prior art, the aperture in the floor mat may have to fit loosely around the retention post. In addition, the present invention reduces the need to redesign the floor mats or trays when the retention post placement is slightly changed; the area of the upper surface of the attachment device can be chosen to be smaller than the area of the second fastener on the dome interior, permitting some lateral shift. More likely, if the design of the OEM retention post or other structure is changed, the adapter that fits it can be changed without redesigning the mat or tray. The attachment device allows for the attachment of the floor mat or tray to the vehicle foot well while maintaining a tight retention and location. By obviating the need of forming a hole in the floor cover for the retention post, the fastening device provides superior protection to the underlying carpet from fluids, debris and the like.

BRIEF DESCRIPTION OF THE DRAWINGS

Further aspects of the invention and their advantages can be discerned in the following detailed description, in which like characters denote like parts and in which.

DETAILED DESCRIPTION

Figure 1:
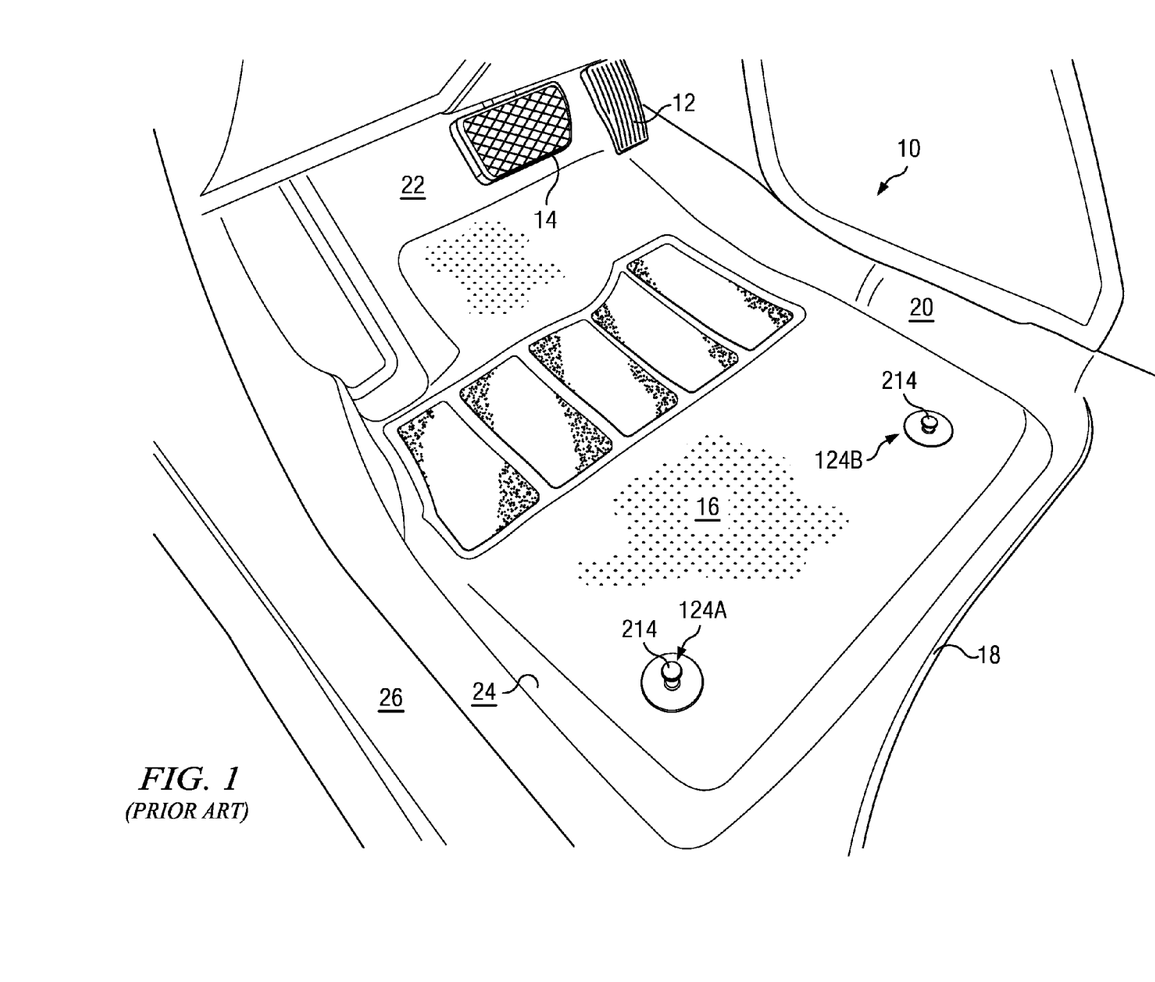
FIG. 1 is a perspective view of vehicle foot well according to the prior art.

FIG. 1 shows a typical original equipment manufacturer (OEM) vehicle foot well 10 prior to a floor mat or tray being placed within it. The illustrated foot well is of the driver's side, as is evident from the gas pedal 12 and the brake pedal 14. Typically although not universally, a floor 16 of the foot well 10 is carpeted. The floor 16 of the foot well 10 may be bounded by other foot well surfaces, so as to form a generally concave shape. These bounding foot well surfaces may include a rear or aft side 18, transitioning the floor 16 to a seat pedestal (not shown); an inboard side 20, which will be disposed between the floor 16 and a transmission tunnel or center console; a firewall 22, which is a forward continuation of floor 16 and which generally slopes upwardly and forwardly, and forward of the gas and brake pedals 12 and 14; and an outboard side 24, which is disposed between the floor well floor 16 and a door sill 26.

Particularly on the driver's side, vehicle manufacturers now usually equip the floor well 10 with one or two hold-down or retention devices, in order fix the mat or tray (generically, "floor cover") in place and prevent its shifting and fouling with gas pedal 12 and/or brake pedal 14. In this illustrated embodiment there are two OEM retention devices 124A and 124B, and they take the form of posts with enlarged heads 214. Many different floor mat retention systems have been developed by different vehicle manufacturers and this makes the provision of custom-fitted foot well covers for these vehicles more challenging. In this illustrated embodiment, the OEM retention posts are meant to be inserted entirely through respective holes in the OEM floor mat (not shown.)

The placement of the spaced-apart OEM retention devices 124A and 124B is typical; OEM retention device 124A is located toward the aft and outboard margins of floor 16, while retention device 124B is positioned toward the aft and inboard corner of floor 16. While OEM vehicle retention devices 124A and 124B stand up more or less perpendicularly from floor 16, they could be located in one or more of the adjacent foot well surfaces and be canted at an angle to the vertical.

Figure 2:
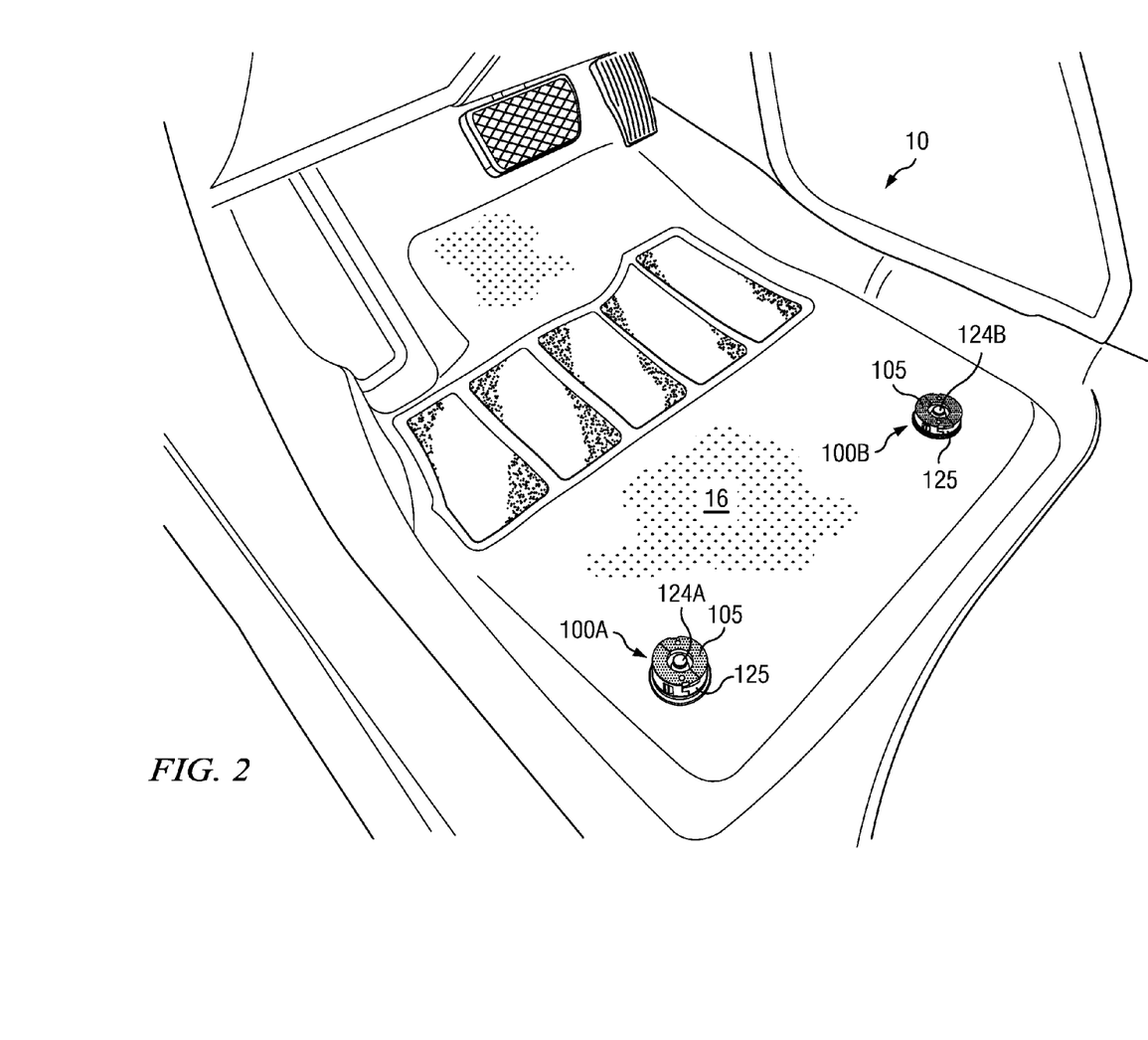
FIG. 2 is a view similar to that shown in FIG. 1, with adapters according to the invention having been installed on original equipment manufacturer (OEM) mat retention devices.

FIG. 2 shows a beginning stage in the deployment of one form of the invention. In one embodiment of the invention, adapters or further retention devices 100A, 100B are furnished for each OEM retention device 124A, 124B. In this embodiment, the adapters 100A, 100B take the form of generally cylindrical pucks or disks which completely surround respective ones of the OEM retention devices 124A, 124B and are affixed to them in such a way that their inadvertent separation becomes highly improbable, even upon application of considerable vertical or lateral force. After their installation, each of the adapters 100A, 100B will present an upstanding sidewall 125 that extends for some distance above the floor 16. Sidewall 125 is at a considerable angle to the floor 16 and in most instances will be roughly perpendicular to it. In the illustrated embodiment, each adapter 100A,B is further equipped with a fastener 105 on its top surface 104. In this illustrated embodiment, fasteners 105 are hook-and-loop material or hook-and-loop molded topography.

Figure 3:
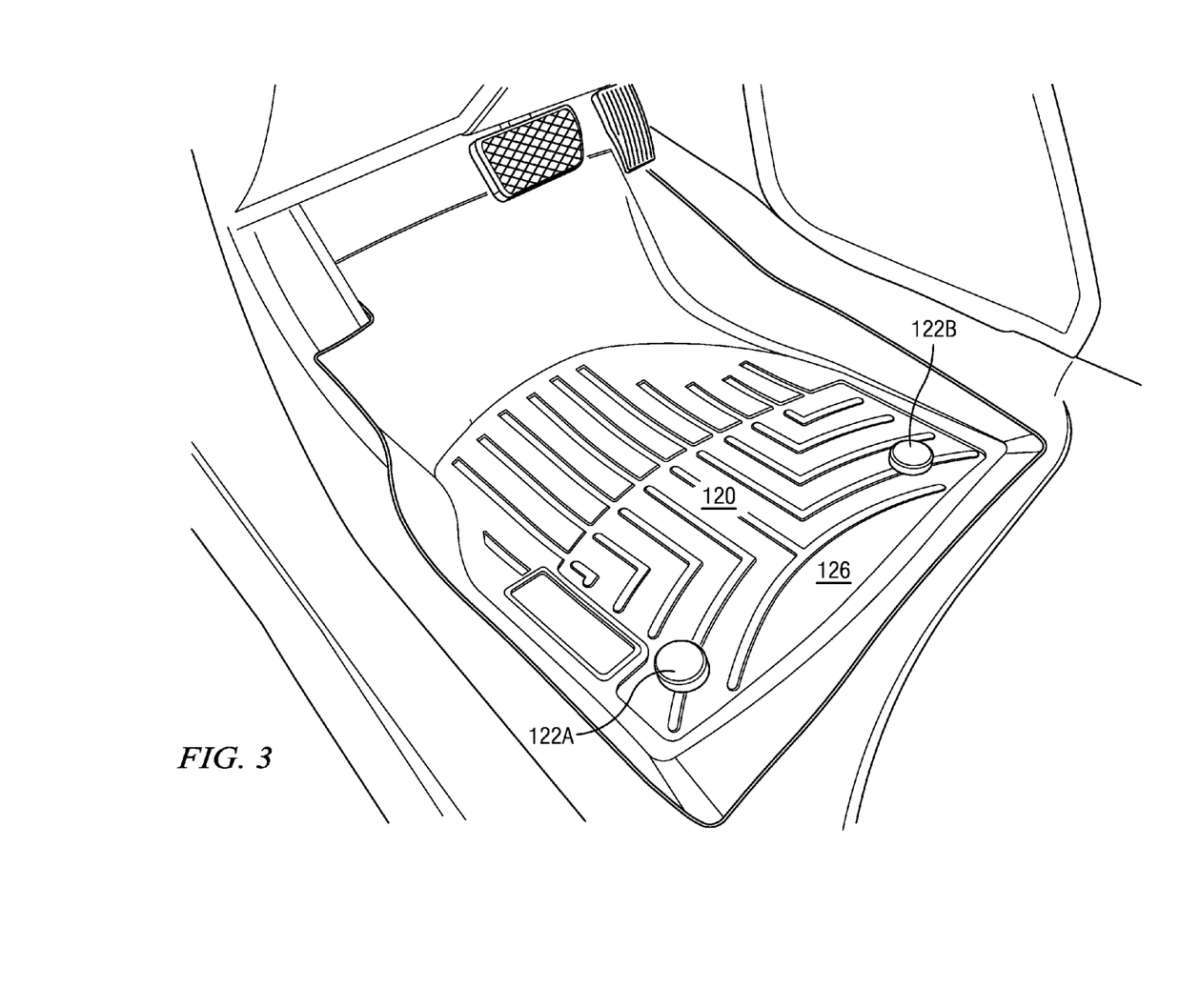
FIG. 3 is a top perspective view of a vehicle floor tray according to the invention, installed in the vehicle foot well using the adapters shown in FIG. 2.
Figure 4:
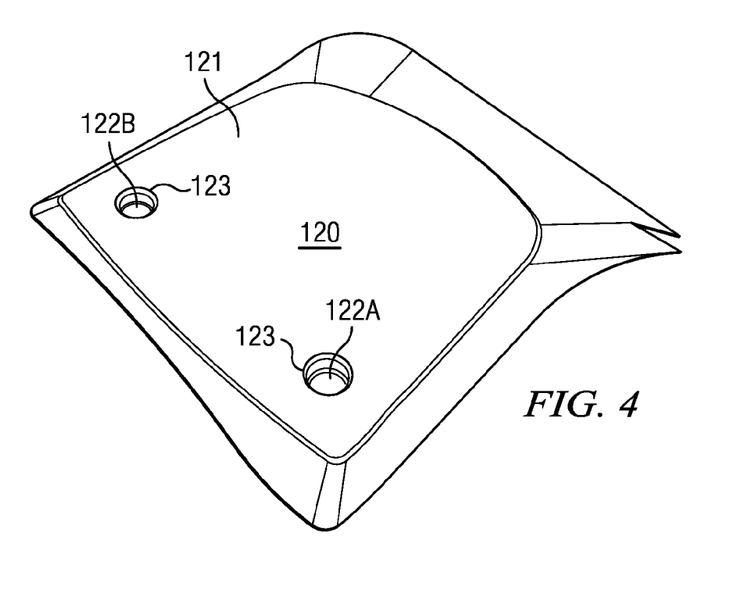
FIG. 4 is a bottom perspective view of the vehicle floor tray shown in FIG. 3.

FIGS. 3 and 4 illustrate a floor cover 120 (the one illustrated here is a floor tray) for use with the retention system of the invention. As seen in FIG. 4, the floor cover 120 has a general lower surface 121 into which are formed a pair of sockets 122A and 122B. Sockets 122A,B are transversely spaced apart from each other and may be located near the rear margin of floor cover 120, and in this embodiment are respectively located near the inboard and outboard margins of the tray 120. The spacing and location of the sockets 122A and 122B match the spacing and location of OEM posts 124A and 124B. Each socket 122A,B has a sidewall 123 which extends upwardly and inwardly from the general lower surface 121.

The sidewall 123 makes a substantial angle to general lower surface 121, as will be described in more detail below. Each socket 122A,B is sized to receive an OEM post 124A or 124B, as previously fitted with an adapter 100A or 100B. The floor tray 120 illustrated in FIGS. 3 and 4 has been thermoformed from a blank of thermoplastic material of substantially uniform thickness. Therefore, in this embodiment each socket 122A or 122B shows up as a puck, dome or other shape on the upper surface of the part which is a projection of the shape of the socket beneath it. Where the floor cover 120 is manufactured by injection or compression molding, the domes or pucks in the upper surface may be less prominent or may be entirely absent.

An end user of the floor cover 120 doesn't have to do much work in installing it into his or her vehicle. The user first fits the OEM posts 124A, 124B with adapters 100A and 100B. Then the user takes the floor cover 120 and positions the sockets 122A and 122B over the attached adapters 100A and 100B so that the adapters 100A and 100B are received within the sockets 122A and 122B. In those embodiments where the adapters 100A and 100B have a fastener such as hook and loop material or topography on their respective upper surfaces, the user presses the sockets 122A and 122B down on the adapters 100A and 100B, and the installation is complete. The user does not have to thread or forcibly press any retention device through an aperture in the mat or tray, and doesn't have to twist or turn any hook, end knob or lock to secure the mat or tray in place.

The retention system of the invention primarily relies on the interaction between adapter sidewall 125 and socket sidewall 123 to prevent lateral movement; one acts as a physical stop to the other. In those instances where there are at least two sockets and adapters 122, 100, the mat or tray is also prevented from rotating around the axis of either.

Figure 5:
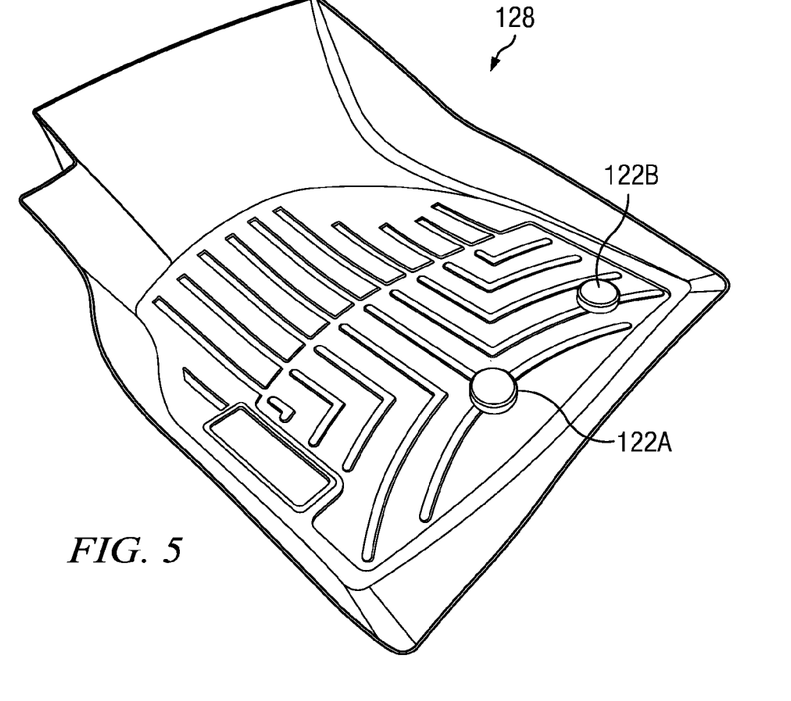
FIG. 5 is a perspective view of another vehicle floor tray according to the invention, showing an alternative placement of sockets.

FIG. 5 illustrates a different embodiment in which a thermoformed floor tray 128 is provided, as before, with sockets 122A and 122B. Socket 122B is located near the inboard and rear margin of tray 128. Socket 122A, however, is located near the longitudinal center line of the part and near its rear margin. This embodiment illustrates that there can be considerable variation in the placement of the sockets 122A and 122B and of the OEM posts with which they are mean to align.

Figure 6:
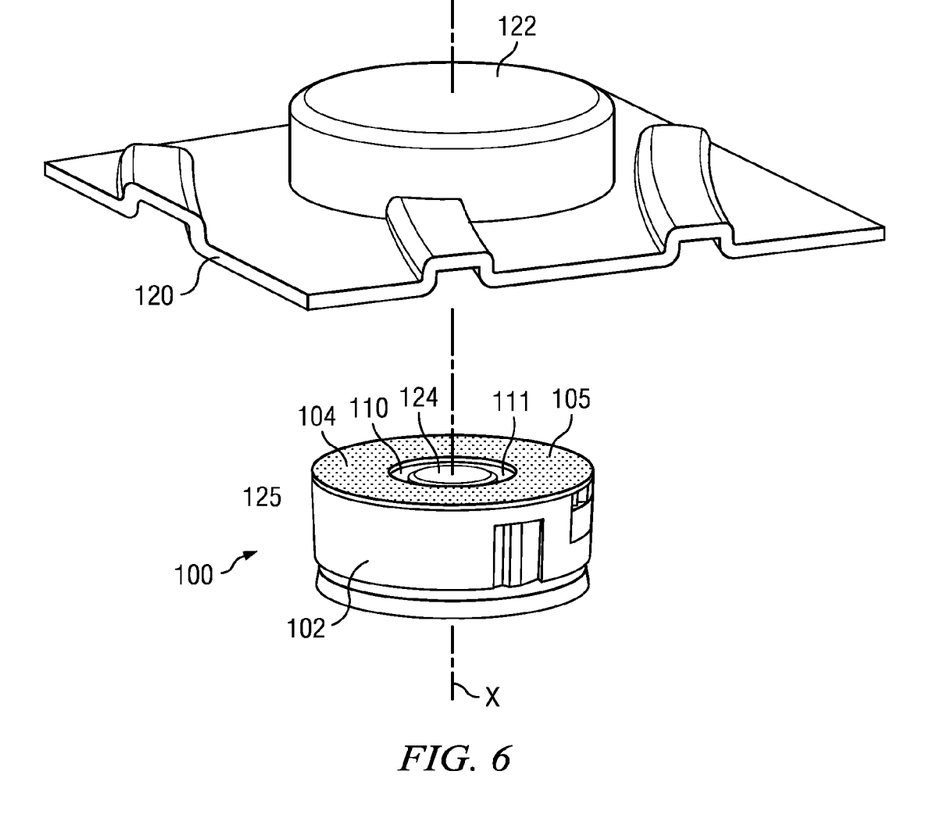
FIG. 6 is a detailed exploded isometric view of a vehicle floor cover retention system using a retention device or adapter as seen in FIG. 2.

A single retention device 100 and an associated portion of a floor cover 120 are seen in FIG. 6. The retention device or adapter 100 includes a body 102 disposed around a vertical axis X. In the illustrated embodiment, the external surface or side wall 125 of the body 102 is substantially circularly cylindrical or pillbox-like and is roughly parallel to axis X. In the illustrated embodiment, side wall 125 is actually slightly frustoconical rather than straight cylindrical; adapter 100 is wider at the top than it is at the bottom. In other embodiments, the external sidewalls of the body 125 can be cylindrical in the mathematical sense (that is, a cross section of the sidewall at one point on axis X will show a shape that is similar to a cross section taken at another point on axis X), prismatic, oval, or other convenient shape, but preferably sidewall 125 is disposed to be at a substantial angle to the horizontal.

The body 102 has a general exterior upper surface 104 on which a first fastener 105 is formed or affixed. For example, the upper surface may be integrally molded with the body 102 so as to have hook or loop features in it; alternatively, a layer of hook or loop material may be applied to a plastic substrate as by gluing or heat bonding. In other embodiments fastener 105 could be a magnet or a snap. The body 102 is preferably injection-molded of plastic but may also be formed from rubber or other thermosetting material, or even a metal. Surface 104 is, in this embodiment, formed to be planar and substantially perpendicular to axis X; more generally the curvature (if any) of surface 104 should be a mirror image of the shape of socket ceiling 217 (described below).

A cavity 110 is formed by the body 102. In the embodiment illustrated by FIG. 6, an opening 111 in the general exterior upper surface 104 communicates it to the cavity 110. In an alternative embodiment, the general exterior upper surface 104 could be continuous with no opening.

Figure 7:
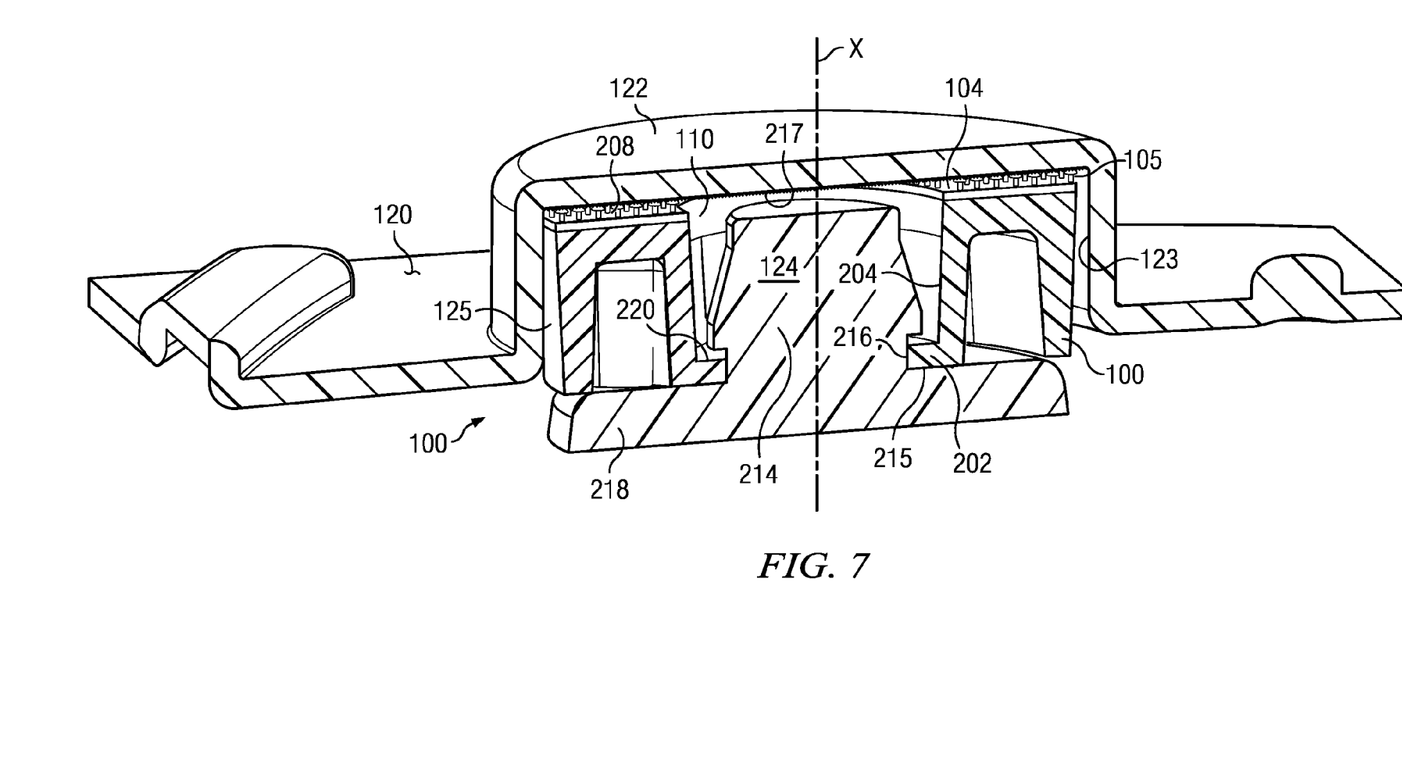
FIG. 7 is a cross sectional view taken through a vehicle floor cover and adapter assembled to an OEM vehicle floor cover retention post.

In FIG. 7, the retention device or adapter 100 is shown assembled around an OEM retention post 124, and the retention device 100 in turn is fastened to the ceiling 217 of socket 122. The illustrated OEM retention device 124 typically is supplied by the vehicle manufacturer and may be of any of various forms, others of which will be described below. The illustrated OEM post 124 has a shaft 216, which terminates in a free and enlarged end or head 214, wherein at least one diameter of the head 214 is larger than the diameter of the shaft 216. In this illustrated embodiment the cavity 110 is disposed between the general upper surface 104 of the device or adapter 100 and an engagement ridge or annulus 202 formed to be remote from the general upper surface 104. Cavity 110 is shown here as having a generally cylindrical interior sidewall 204 although it could take other shapes, as might happen where the enlarged head of the OEM retention post is not radially symmetrical. In the illustrated embodiment a lower surface 215 of the engagement ridge 202 forms or is a part of the lower surface of the adapter 100. The cavity inner surface 204 is dimensioned such that when it receives the head 214 of the retention post, the top of the head 214 of the retention post does not extend beyond the general exterior upper surface 104 of the body 102. In other words, the cavity 110 is tall enough to accommodate the head 214.

The engagement ridge 202 extends radially inwardly from the general inner surface 204 and is axially spaced from the general upper surface 104. The engagement ridge 202 forms a restricted passageway that is dimensioned to receive the shaft 216 of the retention post 124. The passageway formed by the engagement ridge 202 is smaller than the head of the retention post 214, and accordingly, when the body 102 is attached around the retention post 124, it cannot be lifted off by even a large amount of axial force. In the illustrated embodiment, a central passageway defined by the engagement ridge 202 fairly tightly receives the shaft 216; in an alternative embodiment, this fit could have a looser tolerance so as to permit some variance in the shaft size or shape.

A second fastener 208 is placed on an underside of the floor cover 120, and it is preferred that the second fastener 208 be attached to or make up the ceiling 217 of the socket 122. The second fastener may be hook-and-loop material meant to mate with the hook-and-loop material of the first fastener 105; it is also possible for the hook and loop topography to be molded into the ceiling 217. Accordingly, when the floor cover 120 having a socket 122 is placed over the body 102, the second fastener 208 fastens to the first fastener 105. In other embodiments, one of fasteners 105 and 208 can be a magnet and the other of the fasteners 105 and 208 can be a magnet or a piece of ferromagnetic material such as steel. In yet other embodiments, fasteners 105 and 208 could form components of a spring-biased mechanical snap.

Typically, the retention post 124 protrudes upwardly through a layer of carpet (here shown schematically at 218). A thickness of the engagement ridge 202 between its lower surface 215 and its upper surface 220 may be chosen to be smaller than a length of the unenlarged portion of shaft 216, for ease in installation by the consumer.

The upstanding sidewall 123 preferably approaches parallelism with axis X, but in order to get good mold release characteristics, the sidewall 123 may be at a slight angle to axis X, such as up to six degrees, and preferably 3 to 5 degrees. A preferred embodiment of sidewall 125, however, is somewhat inversely frustoconical, such that the top of adapter 100 is slightly larger in diameter than its bottom. In any particular vehicle, the OEM retention post 124 may not be completely vertical but may be canted, either as a result of its being installed in a nonhorizontal surface or because of loose tolerances or controls on such verticality. Sidewall 125 compensates for this somewhat in that even as slightly canted, the sidewall 125 will present an abutment or stop to the sidewall 123 which is more at 90 degrees to the horizontal than the OEM post axis. This maximizes the ability of surface 125 to stop lateral displacement of mat or tray 120 without the socket 122 camming over the top 104 of the adapter 100.

More generally, the adapter 100 minimally should present some sort of bump or impediment to the lateral displacement of the socketed mat or tray 120. Various shapes could achieve this. Preferably the height of socket wall 123 (from ceiling 217 to the general lower surface 121 of floor cover 120) and the height of the retention device sidewall body 125 should be at least 4 mm for acceptable functionality. Further and in the illustrated embodiment, a diameter of socket 122 at ceiling 217 is preselected to be somewhat larger than a diameter of adapter 100 at top surface 104, the difference being at least 2 mm, and more preferably 6 to 8 mm. This loose tolerance is specified to take into account the variation in placement of the OEM retention device to which the adapter 100 is connected. Where the OEM retention device, such as a hook (see below), is not radially symmetrical, this degree of "float" may also vary with the asymmetry of the OEM retention device.

Figure 8:
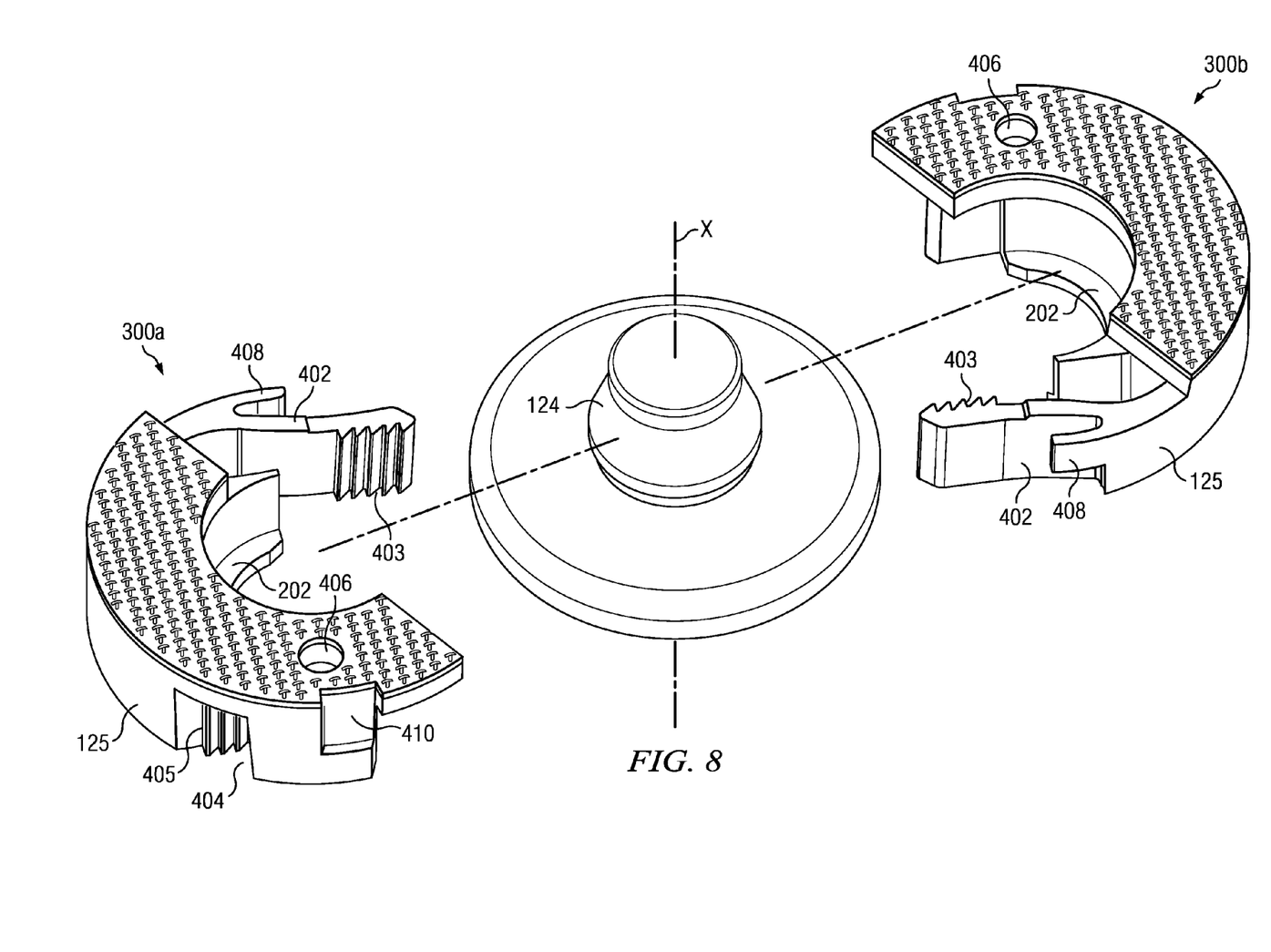
FIG. 8 is an isometric view of an embodiment of an adapter according to the invention as provided in two pieces, the view showing the relationship of the pieces prior to their assembly around an OEM retention post.

In one embodiment the adapter body 102 is made up of at least two separate pieces, and as shown in FIG. 8, may consist of two identical pieces 300a and 300b that each substantially define a half cylinder. The two pieces 300a and 300b are securely attachable to each other. Each of the pieces 300a, b includes a portion of the engagement lip or ridge 202, such as half of it. In an alternative embodiment the body 102 may consist of more than two pieces in a variety of shapes that are securely attachable to each other, with each piece making up a part of the engagement ridge 202. In the illustrated embodiment the first fastener 105 is an annulus which is divided into halves or 180 degree sectors, so that when the pieces 300a,b are fastened together, a complete annulus of engaging material will result.

Figure 9:
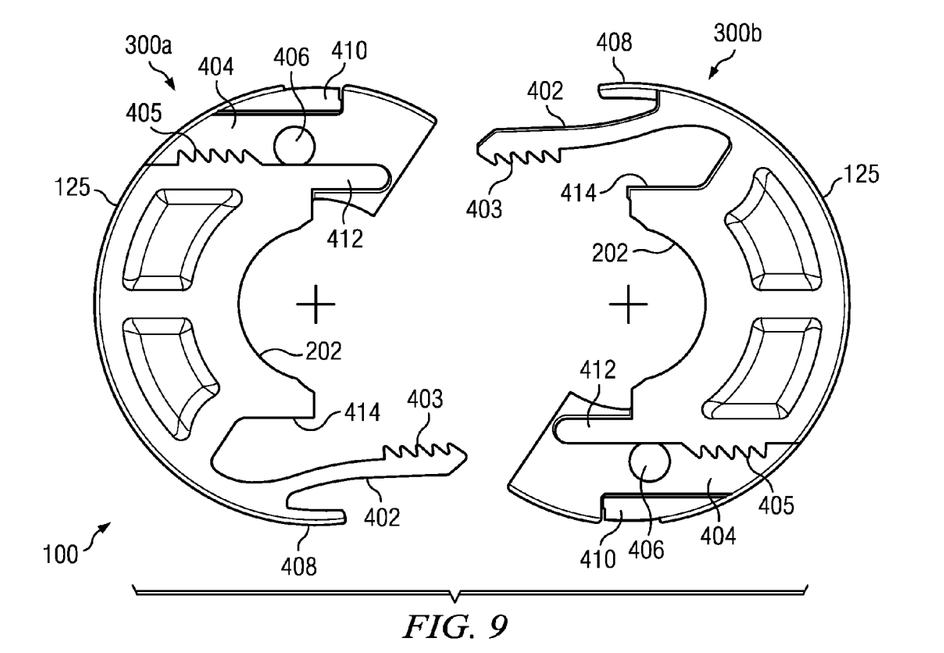
FIG. 9 is a bottom view of the two pieces of the adapter shown in FIG. 8, prior to their assembly.

As shown in FIGS. 8 and 9, a pair of mating or interlocking members 402 and 404 is included in each of the pieces 300a and 300b. The pair of interlocking members 402 and 404 consists of a serrated projection or finger 402 and a serrated channel 404. The serrated projection 402 of once piece is adapted to be slidably received into the serrated channel 404 of the other piece when the two pieces are joined together in a horizontal direction around the retention post 124. The serrations or teeth 403 on the projection 402, and the serrations or teeth 405 within the projection-receiving channel 404, preferably are of the shark-tooth form, such that the force necessary to pull them apart is much greater than the force necessary to put them together. The shark-tooth serrations 403 will easily cam across the teeth 405 in the channel 404 when a projection 402 is inserted into a channel 404, but the reverse will not be true. The teeth or serrations 403, 405 preferably are elongate and are disposed to be in parallel to the axis X, such that they will maximally resist being pulled apart at an angle to that axis.

On each piece, the interlocking members 402, 404 are radially spaced from the axis and extend in a direction parallel to and spaced from that axis. Projections or fingers 402 and channels 404 are disposed below the upper engagement surface 104, radially outwardly from the structure defining cavity 110, and preferably above the engagement ridge 202. The projection 402 of piece 302a will be inserted into a channel 404 of piece 302b on one side of the axis X, while simultaneously the projection 402 of piece 302b will be inserted into channel 404 of piece 302a on the other side of the axis X; the axis is interposed between the two vectors or lines of closing (not shown) of the fastening pairs 402, 404. This spaced-apart placement ensures that the piece 300a will be securely fastened to piece 300b around the retention post 124.

In one embodiment each finger or projection 402 is slightly elastic. This elasticity can be taken advantage of by placing the serrations 403 on the free end of the elongate projection 402, and by extending the projection 402 at an angle which is slightly nonparallel to and inward of the long dimension of the mating channel 404. In this way, a projection 402, when inserted into a channel 404, will have its teeth 403 forced or spring-biased against the teeth 405 of the channel 404. This enhances securement.

Figure 10:
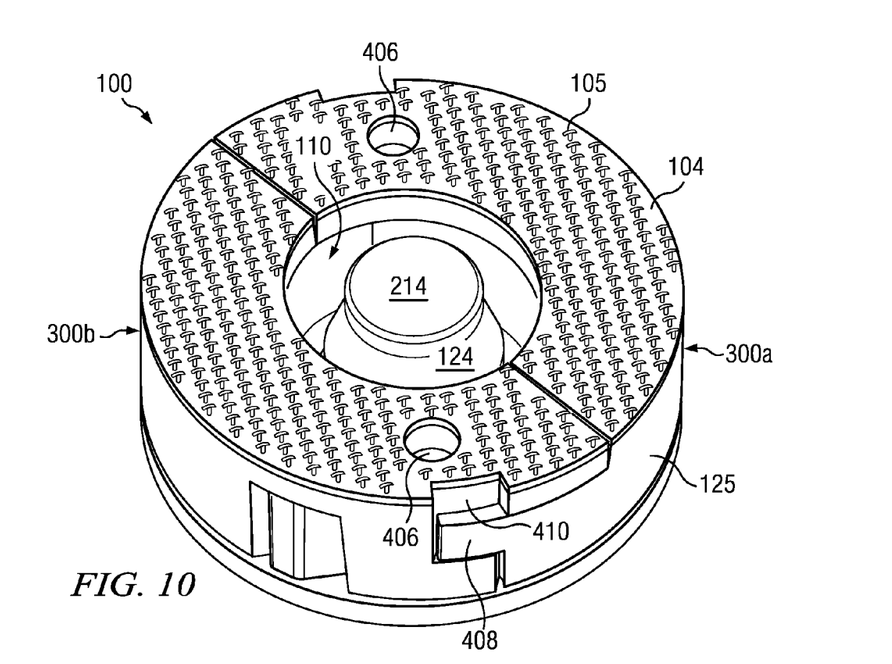
FIG. 10 is an isometric view of the adapter shown in FIG. 8 as assembled around an OEM retention post.

According to one aspect of the invention and as illustrated in FIGS. 8 and 9, at least two access holes 406 may open onto the general upper surface 104. The access holes 406 open on respective channels 404, at locations which are closer to the entrances of the channels 404 than are their serrations or teeth 405. Access holes 406 are positioned such that a screwdriver blade or other tool admitted into an access hole 406 will permit the tool to pry the spring-biased projection or finger 402 of the other piece from the teeth 405 in the channel 404, permitting the user to decouple piece 300a from piece 300b. But as seen in FIG. 10, there intentionally is no other way to remove the attachment device 100 from the retention post 124 without destroying the attachment device 100; as assembled, the fingers or projections 402 are shrouded by the external sidewall 125 of the device 100. This prevents the adapter 100 from becoming inadvertently separated from the OEM retention device 124 to which it is affixed.

Each of the pieces 300a,b also has a pair of guides or processes to aid in the coregistration and assembly of the device 100. The guides also help prevent inadvertent disassembly when the two pieces of the device are twisted torsionally and perpendicularly from the axis X. The first of these, guide 408, is a process which extends roughly in parallel to but spaced outwardly from finger 402. The radially external surface of guide 408 is continuous with exterior surface 125. The guide 408 fits into a pocket 410 on the other of the two pieces 300a,b. Pocket 410 is in the nature of a depression formed in the otherwise continuous curved exterior surface 125.

The other guide or process 412 is best seen in FIG. 9. This guide or process 412 is a continuation of the wall partially constituting channel 404. Process 412, upon assembly to the other piece 300a or 300b, slides along wall 414 of that other piece, even as finger teeth 403 begin to engage channel teeth 405.

The cavity 110 is dimensioned to enclose the OEM retention post head 214. As seen in FIG. 10, the retention post head 214 sits within the cavity 110.

The adapter 100 shown in FIGS. 2 and 4-10 fairly closely fits an OEM retention post 124 of a predetermined type. But adapters or retention devices could be fabricated according to the invention wherein cavities 110 will accommodate any of several different retention post heads, hooks or enlargements of different kinds, so long as the retention post or hook has a terminal head that is larger in axial cross section than a neck or shaft to which is attached. As such, a retention device according to the invention could be used as an adapter to any of several (OEM) vehicle floor cover retention systems, obviating the need to make custom apertures in the mats or trays for different OEM makes or models.

Figure 11A:
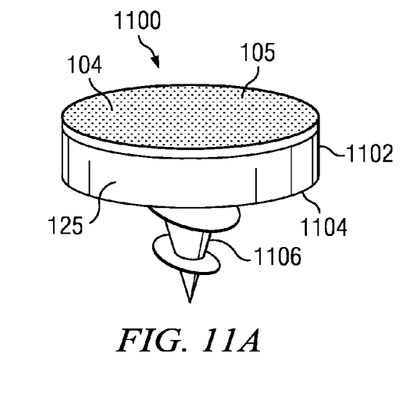
FIG. 11A is an isometric view of another embodiment of a floor cover retention device according to the invention.
Figure 11B:
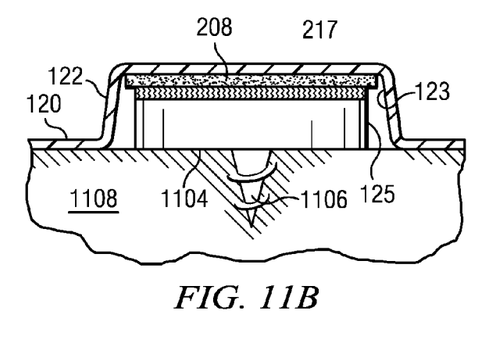
FIG. 11B is a sectional view of the retention device shown in FIG. 11A, as installed in a vehicle foot well and receiving a vehicle floor cover.

FIGS. 11A and 11B illustrate a retention device 1100 which is not an adapter to an OEM retention device but rather is meant to be used where no such OEM devices exist. As before, device 1100 has a body 1102 which is puck or pillbox-shaped, and which has an upstanding sidewall 125 that preferably is roughly vertical and that can be right cylindrical or slightly inversely frustoconical. An upper surface 104 of the body 1102 is finished with hook and loop material 105 as a fastener; other, previously mentioned fastening expedients could be employed instead or in addition. A generally planar bottom surface 1104 has extending downwardly therefrom a central screw 1106 that, as shown in FIG. 11B, is meant to screw into the carpet pile and backing 1108 of a vehicle foot well. Alternatively the central screw 1106 can be replaced with other means to fasten device 1100 to the carpet and preferably its backing; one alternative will be described below. Device 1100 can be injection molded of suitable tough plastic. It is preferred that body 1102 have a diameter that is a little smaller than the diameter of socket 122 of floor cover 120, to provide some tolerance in placement of the device 1100. This device 1100 can be furnished with a mat or floor tray 120 having the same size socket 122 as before.

Figure 12A:
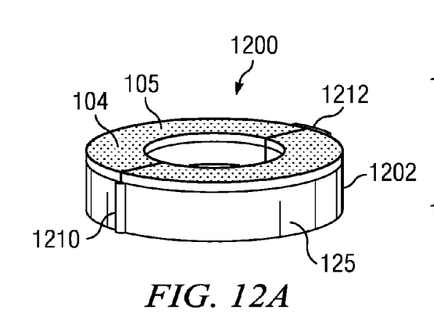
FIG. 12A is an isometric view of another embodiment of an adapter or retention device according to the invention.
Figure 12B:
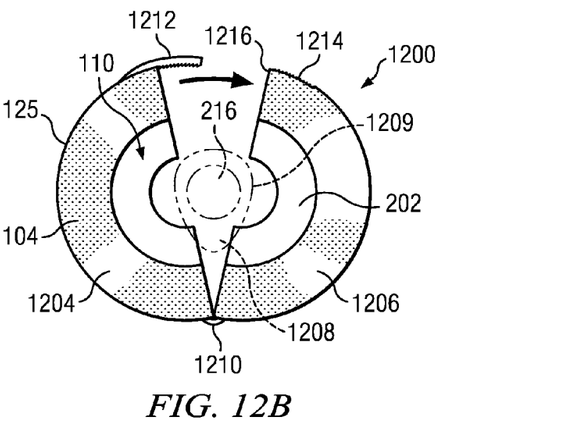
FIG. 12B is a top view of the adapter shown in FIG. 12A, as being closed around an OEM floor mat retention device.

In the embodiment shown in FIGS. 12A and 12B, a device or adapter 1200 has a body 1202 with two halves 1204 and 1206 that are hinged at sidewall 125. The engagement ridge or lip 202 will close around an OEM retention post shaft 216; in this embodiment, the head 1208 of the OEM retention device 1209 can be of irregular shape. The hinge 1210 can be a "living hinge" of relatively thin plastic and is approximately parallel to the device axis. Device body 1202, when closed, will form an annular upper surface 104 which, as before, may be populated with hook and loop material 105. Body 1202 forms a cylindrical cavity 110 which is tall enough to house the OEM retention device head 1208. Halves 1204 and 1206 are kept closed by means such as a ratchet clasp 1212 on half 1204 which, when closed, will engage teeth 1214 formed on exterior surface 125 near an opposite split end 1216 of half 1206.

Figure 13A:
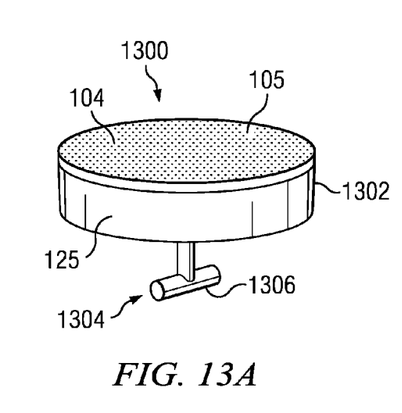
FIG. 13A is an isometric view of another embodiment of a retention device according to the invention.
Figure 13B:
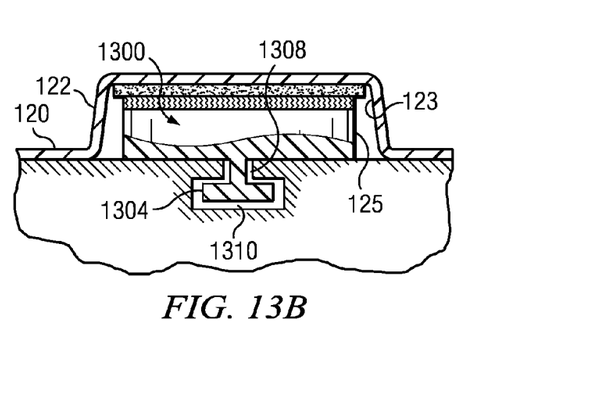
FIG. 13B is sectional view of the embodiment shown in FIG. 13A, shown attaching a floor cover to a vehicle foot well.

FIGS. 13A and 13B show the structure and installation of another embodiment 1300. This device has a solid puck or pillbox-shape body 1302 which, as before, presents a cylindrical or slightly inverse frustoconical surface 125 to sidewall 123 of socket 122 (FIG. 13B). A top surface 104 is provided with a first fastener 105 such as hook-and-loop material or a magnet. A "T" shaft 1304 downwardly extends from the center of a general lower surface of the body 1302. The end of shaft 1304 remote from body 1302 is terminated in an elongate, horizontally extending bar 1306 which will fit through an elongate slot 1308 in the foot well floor (FIG. 13B) in substitution for the OEM floor mat retention device usually inserted therein. The body 1302 is then turned 90 degrees by the user, and the "T" crossbar 1306 thereupon rotates within a disc-like cavity 1310 below slot 1308. Once device 1300 is so installed, it is ready to receive a socketed vehicle floor cover 120, as before. A diameter of the body 1302 preferably is about 4 mm less than a diameter of the socket 122.

Figure 14A:
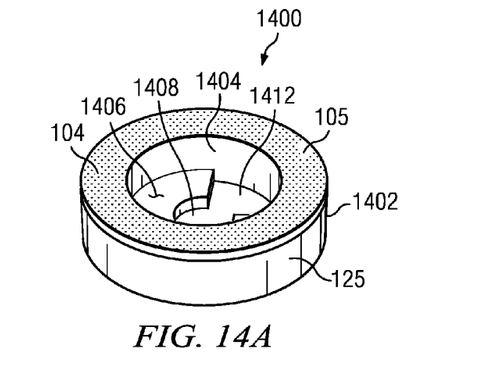
FIG. 14A is an isometric view of another embodiment of an adapter or retention device according to the invention.
Figure 14B:
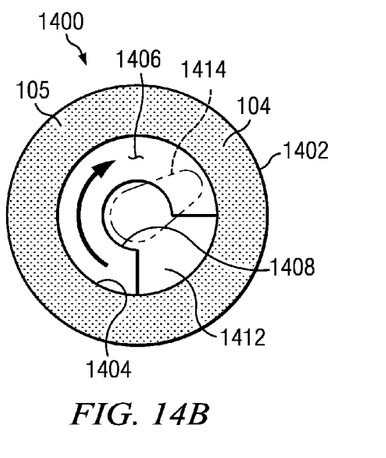
FIG. 14B is a top view of the adapter shown in FIG. 14A, illustrating its attachment to an OEM floor mat retention device.
Figure 14C:
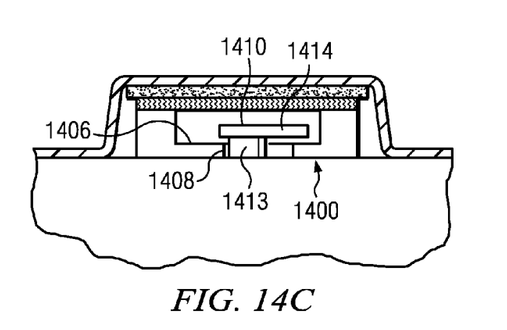
FIG. 14C is a sectional view of the adapter shown in FIGS. 14A and 14B, shown attaching a floor cover to a vehicle foot well.

In the embodiment shown in FIGS. 14A-14C, the device or adapter 1400 has a puck-shaped body 1402 with a cylindrical or slightly inverse frustoconical sidewall 125. A top surface 104 of the body 1402 is formed as an annulus and is fitted with a fastener 105 of one or more of the kinds previously described. A cylindrical cavity 1404 extends from its opening on top surface 104 vertically downward to a bottom 1406. The bottom or floor 1406 is closed except for a central hole 1408, meant to receive a shaft 1413 of a hook-like OEM retention device 1410, and a sector 1412, which is wide enough to admit a hook 1414 that extends from the top of the OEM retention device shaft 1413. To fasten the adapter 1400 in place, the user rotates body 1402 until the hook 1414 is no longer above the sector 1412.

Figure 15A:
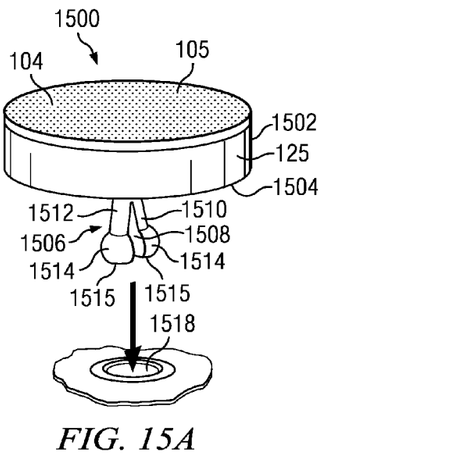
FIG. 15A is an isometric view of another embodiment of an adapter or retention device according to the invention and associated cavity in a vehicle floor well.
Figure 15B:
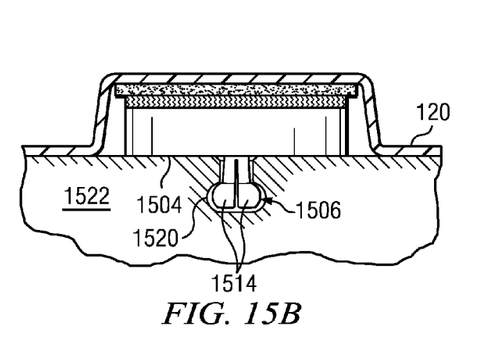
FIG. 15B is a sectional view of the retention device of FIG. 15A, shown attaching a floor cover to a vehicle foot well.

In the embodiment shown in FIGS. 15A-15B, the device or adapter 1500 has a puck-like body 1502 that presents an upstanding sidewall 125 that is either cylindrical or somewhat inversely frustoconical, as before. A top surface 104 of the solid body 1502 may include a first fastener 105 of one or more previously described kinds. Downwardly depending from a center of general lower surface 1504 of body 1502 is an at least bifurcated snap-fit foot 1506, here divided by axially disposed channel or slot 1508 into longitudinal parts or halves 1510, 1512. In other embodiments there can be more channels and more longitudinally divided segments (not shown). Each longitudinal segment 1510, 1512 terminates in an enlarged end 1514. The material (such as plastic) from which the body and/or foot 1506 is formed is selected to have some elasticity, such that a radial inward force directed on either enlarged end 1514 will inwardly depress that end toward the axis and the other such end 1514, temporarily decreasing the diameter of the ends 1514 considered as a whole. The enlarged ends 1514 may each have a chamfered or tapered surface 1515 so that they will easily cam through circular opening 1518 formed above a relatively enlarged cavity 1520, which had been formed in a vehicle foot well floor 1522 by the original equipment manufacturer to receive a predetermined OEM floor mat retention device. The user pushes the foot 1506 through the hole 1518, inwardly compressing the foot segments 1514, which will spring back to occupy cavity 1520 after they pass the constriction. The adapter 1500 is then ready to receive a socketed floor cover 120.

Figure 16:
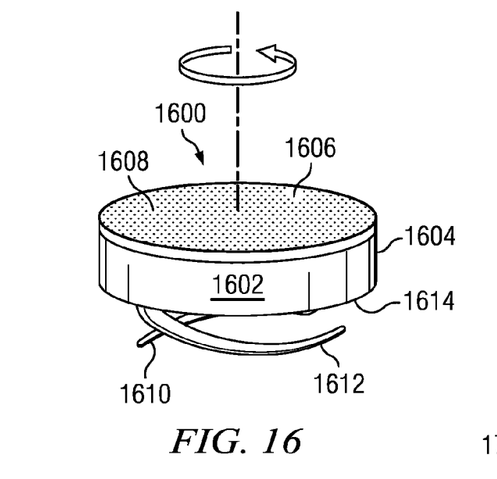
FIG. 16 is an isometric view of another embodiment of a retention device for use with the invention, employing helical tines.
Figure 17:
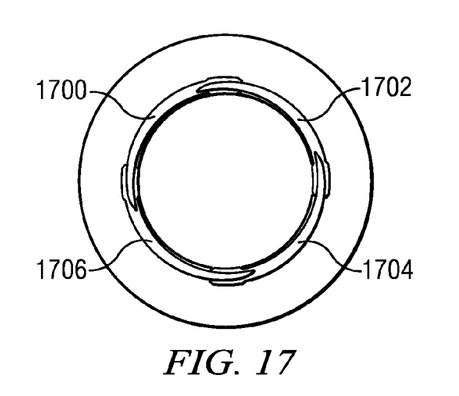
FIG. 17 is a bottom view of an embodiment similar to that shown in FIG. 16, showing four helical tines.

FIG. 16 shows another retention device 1600 according to the invention which is not an adapter. Device 1600 has a body 1602 with a sidewall 1604 which is cylindrical or (as shown) slightly reverse frustoconical. A fastener, such as a layer or topography 1606 of hook-and-loop material, is mounted or molded on into a top surface 1608 of the body 1602. Body 1602 can be solid without a cavity. A pair of angularly spaced-apart helical tines 1610, 1612 extend in helical paths from a general bottom surface 1614 of the body 1602. In this embodiment, there are two such helical tines, but, as FIG. 17 shows, more tines can be supplied as is convenient. The tines 1610, 1612 can be fashioned of steel wire and may have upper ends embedded or in-molded into the body. Similar carpet connectors are disclosed in the Applicants' U.S. Pat. Nos. 6,385,812 and 6,412,142, the entire disclosure and drawings of which are incorporated herein by reference. The tines 1610, 1612 can follow helical paths, as shown, or can terminate in straight segments, as depicted in U.S. Pat. No. 6,412,142. Alternatively the tines 1610, 1612 can be fashioned of hard plastic. In operation, the user simply screws the body 1602, and with it the tines 1610, 1612, in a counterclockwise direction so that the tines 1610, 1612 pierce the carpet and bite into the backing (not shown) underneath. The height of body sidewall 1604 is chosen to be an effective physical stop to a respective floor cover socket sidewall 123, as has been previously described.

FIG. 17 is a bottom view of a variation of device 1600. In this embodiment, there are provided four equally angularly spaced apart tines 1700-1706 rather than two.

Figure 18A:
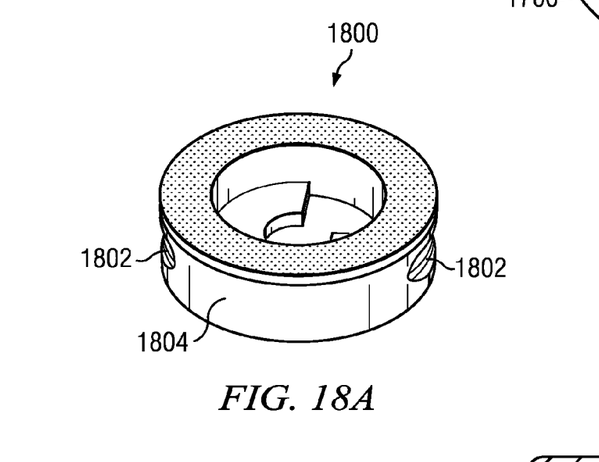
FIG. 18A is an isometric view of another embodiment of a retention device or adapter according to the invention and showing finger depressions to aid in a manual twisting motion.
Figure 18B:
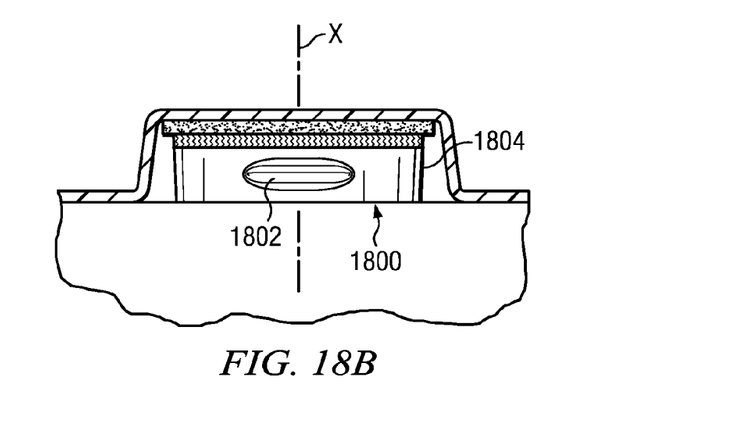
FIG. 18B is a side view of the embodiment shown in FIG. 18A.

FIGS. 18A and 18B illustrate a feature which is particularly suited to those devices described above which are meant to be rotated by hand in their installation, either into the carpet or to be attached to a preexisting OEM device. A body sidewall 1800 may be formed as a surface of rotation around the body's axis, and preferably will be generally circularly cylindrical or somewhat reverse frustoconical as before, but won't be completely so. Instead, the sidewall 1800 will have angularly spaced-apart depressions 1802 formed into it to provide purchase to the fingers of a human hand. Preferably there should be multiple ones of the depressions 1802, such as at least two, to fit to a thumb and an opposing finger. There can be more depressions than this (not shown) depending on the size of the body 1804. The depressions can take the form of concavities as shown. Other finger-engaging surfaces can instead be supplied, all of which will be departures from surfaces of rotation around the axis X of the body 1804. But the departures should not be so severe that the primary function of the body, i.e., being a physical stop to the lateral translation of a socket sidewall, would be compromised. The sidewalls of the device bodies shown in FIGS. 11A-B, 13A-B and 14A-B could all bear depressions similar to depressions 1802, as each of these embodiments is meant to be axially twisted by the human hand.

In summary, a relatively passive vehicle floor cover retention system uses device bodies or adapters with upstanding side walls that are received in respective floor cover sockets. The devices or adapters can be of various kinds developed to replace or augment OEM retention devices of various kinds, and act as physical stops against lateral motion of the floor mat or tray. While illustrated embodiments of the present invention have been described in the above description and illustrated in the appended drawings, the present invention is not limited thereto but only by the scope and spirit of the appended claims.

We claim:

1. An adapter for limiting the lateral movement of a vehicle floor cover relative to a vehicle foot well equipped with at least one original equipment manufacturer (OEM) retention post upstanding from the vehicle foot well, the post having a shaft of a first diameter and a head of a second diameter larger than the first diameter, the adapter comprising:
    a body disposed around an axis, the body having a general exterior upper surface; an engagement ridge of the body axially spaced from and joined to the general exterior upper surface;
    a cavity formed in the adapter body to be disposed between the general exterior upper surface and the engagement ridge, the cavity having a general inner surface and dimensioned to receive the head of the retention post;
    the engagement ridge extending radially inwardly from the general inner surface and forming a passageway dimensioned to receive the shaft of the retention post, the passageway being smaller than the second diameter; and
    the body provided in at least first and second pieces wherein the first piece is securely attachable to the second piece, the first and second pieces each forming a portion of the engagement ridge, such that when the pieces are closed on each other around the retention post, the cavity will enclose the head of the retention post.

2. The adapter of claim 1, and further including a first fastener disposed on the general upper surface of the body, the first fastener adapted to mate with a second fastener disposed on a vehicle floor cover.

3. The attachment device of claim 2, wherein first fastener comprises a layer of releasable fastening material adapted for fastening to another layer of releasable fastening material.

4. The adapter of claim 3, wherein the body is formed of plastic.

5. The adapter of claim 3, wherein the outer surface of the body is generally cylindrical.

6. The adapter of claim 3, wherein the first piece and the second piece are identical.

7. The adapter of claim 1, wherein the general exterior upper surface of the body is planar and substantially perpendicular to the axis.

8. The adapter of claim 1, wherein the general inner surface of the cavity is cylindrical.

9. The adapter of claim 1, wherein each of the first piece and the second piece includes a pair of interlocking members.

10. The adapter of claim 9, wherein each of said pair of interlocking members includes a serrated channel and a serrated projection, the serrated projection of the first piece being slidably receivable into the serrated channel of the second piece and the serrated projection of the second piece is slidably receivable into the serrated channel of the first piece.

11. The adapter of claim 9, wherein the serrated projection of the first piece, when inserted into the serrated channel of the second piece, is spring-biased such that serrations of the projection of the first piece will be biased against serrations of the channel of the second piece.

12. The adapter device of claim 9, wherein each serrated projection, when inserted into a respective channel, is shrouded from the exterior by an exterior sidewall of the body.

13. The adapter of claim 12, wherein each piece has an access hole disposed on the general exterior upper surface and communicating the upper surface to one of the channels, each hole adaptable to admit a tool for disengaging the respective projection from the respective channel once the first and second pieces are fastened to each other.

14. The adapter of claim 1, wherein the engagement ridge tightly encloses the OEM retention post shaft.

15. The adapter of claim 1, wherein an opening in the general exterior upper surface of the adapter body communicates the cavity to the general exterior upper surface of the adapter body.

* * * * *